UNFIRED STATE

FIRED STATE

UNFIRED STATE

FIRED STATE

*INVENTORS*
HARRY L. SAUMS
WESLEY W. PENDLETON

ATTORNEYS

United States Patent Office 3,273,225
Patented Sept. 20, 1966

3,273,225
METHOD OF MAKING ELECTROMAGNETIC STRUCTURES FOR HIGH - TEMPERATURE SERVICE
Harry L. Saums, North Muskegon, and Wesley W. Pendleton, Muskegon, Mich., assignors, by mesne assignments, to Anaconda Wire & Cable Company, a corporation of Delaware
Filed Feb. 14, 1962, Ser. No. 173,115
26 Claims. (Cl. 29—155.57)

This is a continuation-in-part of our copending application Ser. No. 763,187 filed September 25, 1958, now abandoned.

This invention relates to electromagnetic structures and, more particularly, to the manufacture of insulated electromagnetic windings in which the insulation is an inorganic dielectric. The invention provides improved insulated electromagnetic windings and a method for manufacturing windings which are capable of being continuously operated at temperatures of from 300° C. to 500° C., or more, and which may be successfully employed in electric generators, motors and other electromagnetic apparatus designed for service at high temperatures.

One of the most important of the limiting factors which must be considered in the design of any electromagnetic machine or apparatus is the temperature at which the insulation surrounding the magnet wire of the electromagnetic winding either is thermally deformed or undergoes thermal degradation. Operation of the machine at or near this temperature sets in motion a chain of events which ultimately results in complete failure of the machine, for when the insulation of the electromagnetic winding melts or is thermally degraded, the adjacent turns of magnet wire which make up the winding come into contact with each other and with the frame of the machine, thereby creating short circuits which markedly decrease the impedance of the winding. This decrease in impedance is accompanied, not only by a decrease in the required magnetic field, but also by an increase in power consumption which, in turn, results in a further increase in the temperature of the system and ultimately in a complete failure of the electromagnet and hence of the machine. Consequently, the design of electromagnetic machinery for high-temperature service requires specially insulated windings, the insulation of which is not subject to either plastic flow or thermal degradation at the temperature at which the machine is designed to operate.

Were the selection of the proper dielectric for insulating the electromagnetic winding the only problem which is faced in the manufacture of electromagnetic machines for high-temperature service, then electric motors for example, capable of operating at very high temperatures could be designed and fabricated, since a number of dielectrics, notably the inorganic dielectrics, possess both the requisite thermal stability and insulating properties necessary for these windings. However, other important limiting factors than the thermal characteristics of the magnet wire insulation influence electric motor design, the most important of which is maintaining the size and weight of the motor at a minimum for a given power output. As a general rule, the trend in electric motor design is toward smaller, lighter electric motors having increased power capacity.

Small, lightweight electric motors require correspondingly small and compact electromagnetic windings. However, most of the organic polymers used to insulate magnet wire, from which electromagnetic windings are formed, suffer serious deterioration at temperatures not far above 200° C. Although other organic polymer dielectrics, notably the polytetrafluoroethylenes, are thermally stable at much higher temperatures, it is very difficult, if not impossible, to apply thin films of these polymers to magnet wire. Because almost all of the small and compact electromagnetic windings presently manufactured for high temperature service are insulated with organic polymer dielectrics which melt or undergo deterioration at temperatures at or near 200° C., the maximum temperature at which electric motors specifically designed for high temperature service can be safely operated is approximately 185° C., or lower.

In theory, this maximum temperature could be increased by using certain inorganic dielectrics to insulate the magnet wire since as a general rule inorganic insulation is far more stable at high temperatures than is organic insulation of the same dielectric value. However, magnet wire which is insulated with an inorganic dielectric, such as mica, porcelain, glass, asbestos, or quartz, cannot be satisfactorily formed into an electromagnetic winding since the inorganic insulation lacks sufficient mechanical strength to withstand the hazards of winding. For example, when magnet wire insulated with a serving of braided glass fibers is formed into a winding, the individual glass fibers, being brittle and smooth, crack and invariably separate from one another, exposing the underlying magnet wire. In fact, merely winding the magnet wire results in cracking of the insulation, the more fragile or brittle the insulation the more pronounced its breakage. Since brittleness is characteristic of all inorganic dielectrics, the use of inorganic insulating materials as the sole insulation for electromagnetic windings has been virtually restricted to only the very largest electromagnets devoid of small radii.

The present invention provides an improved method for manufacturing insulated electromagnetic windings which are capable of continuous operation at temperatures up to 500° C. or more, and in which the sole insulation is an inorganic insulating material. In accordance with the invention, these electromagnetic windings are manufactured by applying a flexible abrasion-resistant insulation to magnet wire, the insulation comprising a covering of fibrous inorganic dielectric material initially bonded in place by an organic varnish or enamel, and then forming this insulated wire into a winding. No matter how tightly the wire is wound, the organic varnish or enamel reinforces the inorganic fibers and completely prevents breakage or loosening of the fibrous inorganic dielectric material and exposure of the underlying conductor. After the winding has been formed, it is heated to a temperature above the pyrolysis point of the organic varnish for a sufficient period of time to pyrolytically volatilize all organic matter from the covering and leave the formed winding insulated solely by the inorganic dielectric material. Because the final insulation is solely inorganic and because it is thermally stable at temperatures as high as 500° or even more, electromagnetic windings made in accordance with the invention may now be successfully employed in any electromagnetic apparatus or machine designed to operate at or below such temperatures.

It has particularly been found that fibrous inorganic material which is served or in any way applied to the conductor can be bonded thereon in a novel manner by coating it with a slurry of organic varnish pigmented with at least one finely-divided glass. When such a bonding material is used, the winding subsequently formed with these conductors is first heated to a temperature above the pyrolysis point of the organic varnish but below the fusion point of the finely-divided glass to pyrolytically volatilize all organic matter, and is then heated to a temperature above the fusion point of one of the finely-divided glasses but below the fusion point of the fibrous inorganic material, thereby fusing the glass about the fibrous inorganic material. Alternatively, it has been found that by coating a conductor with an enamel consisting of an organic varnish pigmented with finely-divided glass fibers of a particular size, a mat structure is produced by the glass fibers such that they tend to adhere to the conductor between the pyrolysis step and the fusing step, and do not fall off as would be the case if ordinary powder or flake forms of glass were employed. When the finely-divided glass particles are used there is little or no fall-out of glass particles upon application of the glass slurry as was often the case when dense particles were used.

The magnet wire employed in manufacturing electromagnetic windings in accordance with the invention may be fabricated from any metallic conductor, such as copper, aluminum or bronze, which is sufficiently flexible to be formed into a winding. In some instances it is advantageous to employ a metallic conductor which is sheathed or jacketed with a thin layer of a dissimilar metal or with a metallic oxide which is resistant to oxidation. This protective coating is especially required where the electromagnetic winding will be subjected to oxidative temperatures or conditions. For example, where the magnet wire is made from aluminum, mere exposure of the wire to air forms a thin film of aluminum oxide over the surface of the conductor and protects it from further oxidation. Where copper magnet wire is used, a thin jacket of nickel or aluminum may be disposed over the surface of the conductor to prevent its oxidation at high temperatures; this oxidation-resistant jacket may be either electrodeposited or extruded onto the surface of the copper magnet wire.

The magnet wire is covered with a flexible abrasion-resistant insulation of a fibrous inorganic dielectric material bonded in place by an organic varnish or enamel alone, or pigmented with one or more finely-divided glasses. Various fibrous inorganic dielectrics have been used, including fibers of mica, quartz, and asbestos, but one satisfactory dielectric has been textile glass fiber manufactured from an alkali-free glass. These textile fibers are soft and lustrous, the individual fibers being very small in diameter, and may be bonded to the metallic conductor (especially to copper) with a high-grade insulating varnish to produce a smooth, abrasion-resistant insulation. Particularly satisfactory results have been achieved with borosilicate type glasses, both as a pigment in the varnish and as a serving of fiber glass.

To apply the flexible abrasion-resistant insulation to the metallic conductor prior to forming the winding, the fibrous inorganic dielectric material is served over the wire and the serving coated or impregnated with an organic varnish alone, or pigmented with finely-divided glasses to bond it in place. Alternatively, the bare metallic conductor may be coated with varnish and a serving of the fibrous inorganic dielectric immediately applied to the wet conductor; as the varnish dries, the fiber is bonded to the conductor. In a further alternative, as mentioned above, an organic varnish impregnated with finely-divided glasses of a particular particle size may be applied to coat the conductor. Any alternative may be used to apply the abrasion-resistant insulation to the conductor since all result in excellent adherence of the inorganic material to the conductor and of the individual fibers to each other.

Selection of a suitable organic varnish or enamel to bond the fibrous inorganic dielectric to the magnet wire may be made from any varnish which is capable of bonding the inorganic fiber to the metallic conductor and of bonding the individual fibers to each other and of holding the finely-divided glasses in suspension, since the primary function of the varnish is to protect the inorganic fiber from cracking or breaking while the coated conductor is being formed into a winding. In addition, the pyrolysis point of the particular varnish used (the pyrolysis point being that temperature at which all of the organic matter in the varnish becomes fugitive or is pyrolytically volatilized), must be appreciably below the fusion point or temperature of the particular inorganic fiber used to form the abrasion-resistant insulation about the magnet wire. Particularly satisfactory results have been obtained by using varnishes prepared from polyethylene terephthalate or other polyesters, from cellulose acetate or butyrate or from other cellulosic material, from epoxy resins and from phenolic resins, all of which are completely fugitive at their pyrolysis points.

Partially fugitive organic varnishes, which contain an inorganic moiety, may also be used to bond the fibrous inorganic dielectric to the conductor and thereby form a flexible, abrasion-resistant insulation about the magnet wire. Upon heating these varnishes to their pyrolysis point, only the organic matter volatilizes, leaving an inorganic residue which forms a matrix with the inorganic fiber. In particular, partially fugitive organic varnishes which contain silicon, such as those prepared from polysiloxanes, polysilanes, or polysilcarbanes, have been found satisfactory. Other varnishes, prepared from organogermanium, organotitanium, or organozirconium polymers, or from coordination polymers containing these materials, may be used to bond the inorganic fiber in place to form a flexible, abrasion-resistant insulation in any of the ways discussed. Since the heat of decomposition of carbon-carbon bonds is generally much lower than the heat of fusion of the lowest melting inorganic dielectric, all of these varnishes, including those which are completely or even partially fugitive at their pyrolysis points, may be pyrolytically volatilized from the abrasion-resistant insulation without reaching the fushion point of the inorganic fiber.

After the inorganic insulation has been rendered flexible and abrasion-resistant as described, the magnet wire thus insulated may be formed into an electromagnetic winding of any desired shape without danger of cracking or mechanically destroying the inorganic fiber since this fiber is firmly bonded to the underlying conductor. The winding is then heated to a temperature which is equal to or above the pyrolysis point of the organic varnish but below the fushion temperature of the finely-divided glass or the inorganic fiber, the heating being conducted for a sufficient period of time, preferably under vacuum, to pyrolytically volatilize all of the organic matter from the covering, yet leave the formed winding insulated solely by the inorganic dielectric material. When finely-divided glass is incorporated in the insulation as described above, the winding is then heated again to a higher temperature to fuse the finely-divided glass to the conductor or to the inorganic fiber. If, as in the case of glass fiber insulation, this prolonged heating results in the appearance of small cracks of fissures in the final insulation, the quality of the electromagnetic winding is not impaired, since these cracks or fissures only become serious when the winding is operated in the presence of excessive moisture. Inasmuch as very little ambient humidity exists at temperatures of 300° C. or higher, the presence of these small cracks or fissures in the inorganic insulation does not impair the operating characteristics of the electromagnetic winding.

To minimize or even eliminate the formation of these small cracks and fissures which may appear in the final insulation of the electromagnetic winding when glass fiber is used as the inorganic dielectric material, the magnet wire is served over with two different types of glass fibers bonded in place by an organic varnish to form a flexible, abrasion-resistant insulation. One type of glass fiber in this insulation has a high fushion point (such as an aluminum borosilicate glass of the type to be discussed below) while the other type possesses a much lower fusion temperature (such as a barium borosilicate glass also to be discussed below). After the thus-insulated magnet wire has been formed into a winding of any desired shape, the winding is heated to a temperature which is above both the pyrolysis point of the organic varnish and the fusion point of the low-fusion type of glass fiber but below the fusion temperature of the high-fusion type of glass fiber. This heating is carried out for a sufficient period of time to pyrolytically volatilize all organic matter from the covering and to partially fuse the low-fushion glass which, in turn, forms an interstitial bond between the remaining unfused (high-fusion type) glass fiber, thereby leaving the formed winding insulated solely by glass fiber bonded in place by fused glass.

This same effect can also be achieved by serving the conductor with a high-fusion type glass and binding the servings with a slurry containing organic varnish pigmented with a finely-divided high fusion type glass and a finely-divided low fusion type glass. After forming the winding it is first heated at a temperature above the pyrolysis point of the organic varnish but below the fusion point of the finely-divided glasses to pyrolytically volatilize all the organic varnish. The winding is then heated at a temperature above the fushion point of the low fusion type glass but below the fusion point of the high type glass to fuse the finely-divided glasses together about the servings thereby leaving the formed winding insulated solely by glass fiber bonded in place by fused glass.

In some instances it is particularly advantageous to use two different types of glass fibers bonded in place by a polysiloxane varnish to form the flexible, abrasion-resistant insulation about the magnet wire. When a winding formed from this magnet wire is heated to a temperature which is above both the pyrolysis point of the polysiloxane varnish and the fushion point of the low-fusion type of glass fiber, yet is below the fusion point of the high-fusion type of glass fiber, all of the organic matter from the covering pyrolytically volatilizes while the low-fusion type of glass fiber partially fuses. The residual silicon dioxide remaining from the pyrolyzed varnish together with the partially fused glass form a bonding between the remaining unfused glass fibers, thereby leaving the formed winding insulated solely by glass fibers bonded in place by a matrix of fused glass and residual silicon dioxide. Electromagnetic windings manufactured by this modification of the invention are capable of being continuously operated at temperatures of about 50° C. for extended periods of time.

The temperature to which the winding is heated is, of course, dependent upon the pyrolysis point of the organic varnish which forms part of the flexible, abrasion-resistant insulation surrounding the conductor, the only limitation being that this temperature be below the fusion point of the inorganic dielectric material or below the highest fusion temperature of the inorganic dielectric if more than one is used. In no event, therefore, should the conductor be insulated with a fibrous inorganic dielectric having a lower fusion temperature than the pyrolysis point of the organic varnish. In general, the winding should be heated to a temperature which is equal to or just above the pyrolysis point of the organic varnish since this temperature will not usually affect the inorganic dielectric material. In some instances, however, the inorganic dielectric material may suffer if it is subjected to temperatures which are far above the intended operating temperature of the winding, and consequently sufficient control should be exercised during the heating of the winding to prevent any change in the dielectric properties of the inorganic dielectric material.

Preferred embodiments of the invention are described hereinbelow with reference to the drawings wherein.

In one specific embodiment of the invention, an electromagnetic winding was manufactured from a bare copper magnet wire which had previously been sheathed with a thin but continuous layer of nickel to prevent oxidation of the conductor at the high operating temperatures to which the winding was to be subsequently exposed. This magnet wire was served over with braided fiberglass and then immersed in a solution of polyethylene terephthalate dissolved in a naphtha-cresol solvent pair. After wiping excess solution from the coated wire, it was passed through a vacuum drying oven to remove all traces of solvent and bond the fiberglass to the conductor and thereby produce a smooth, abrasion-resistant surface. The magnet wire was then introduced into a winding apparatus where, under slight tension, it was formed into a winding of the desired shape, during which time the individual glass fibers contained in the insulation neither separated from each other nor from the conductor, even though they were subjected to considerable bending, friction and wear. The winding (and a sufficient number of others similar to it) was inserted into its proper slot in an electric generator, and the entire machine was then placed in a vacuum oven and heated to a temperature of about 500° C. until all of the organic matter had been pyrolytically volatilized and removed from the coating covering the winding. After all of the organic matter had been removed, the generator was cooled very slowly to prevent the formation of fissures and cracks in the glass insulation and to anneal the nickel-plated magnet wire which had become slightly hardened during the winding operation. This machine could be continuously operated at temperatures from 300° C. to 500° C. without any danger of thermally-induced failure.

Figure 1:
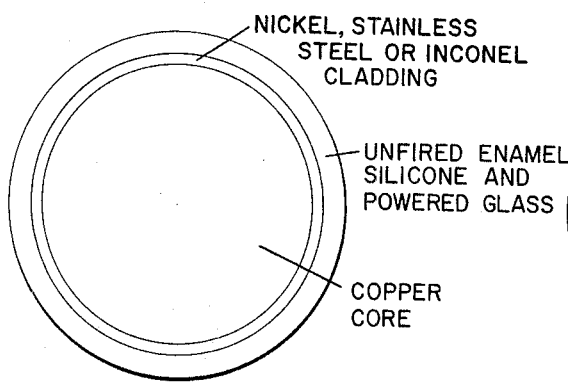
FIG. 1 is an enlarged section of a copper wire sheathed with a thin layer of nickel and coated with unfired enamel silicone and powdered glass.
Figure 2:
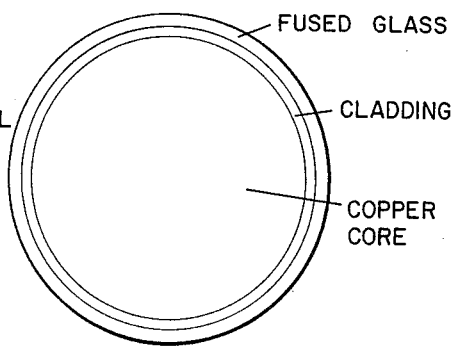
FIG. 2 is an enlarged section showing the copper wire of FIG. 1 after it has been fired leaving the wire coated with fused glass.

In another specific embodiment as shown in FIGS. 1 and 2 of the invention a wet enamel or slurry was applied to an oxidation resistant bimetallic conductor (e.g. a copper conductor clad with nickel, aluminum or stainless steel) in the conventional manner with a ball or grooved die. Multiple coats were applied interspersed with oven baking steps in a continuous operation.

The slurry consists of a liquid polyester modified diphenyl siloxane (silicon resin) pigmented in a 4:1 resin to pigment ratio by weight, with finely-divided inorganic material. This finely-divided inorganic material is preferably formed from a low melting borosilicate type glass and is preferably in either a flake, powder, or finely-divided fiber form. It has particularly been found that the formation of glass fibers in a limited range of particle sizes has contributed appreciably to the commercial production of this fine wire.

In one example a barium borosilicate glass in the following composition:

| | |
|---|---|
| $SiO_2$ | 27.7 |
| $CaF_2$ | 6.4 |
| $ZnO$ | 5.30 |
| $CaO$ | 4.5 |
| $BaO$ | 17.2 |
| $Na_2O$ | 11.7 |
| $B_2O_3$ | 26.3 | was obtained in a felt-like sheet formed of fibers which are initially 1 micron or less in diameter and approximately 1 mil long. The felt is cut into short strips and admitted to a pebble mill with xylol. The glass is milled in the ceramic barrel of the pebble mill for approximately 3–4 days until the average length of the glass fibers is 2–5 microns. This grinding has not been found to affect the cylindrical or fiber nature of the glass; it seems only to shorten the fiber lengths.

It has been found that glass fibers in a range of from 0.05 to 1.0 micron in diameter and 1–10 microns in length depending on the diameter (the ratio of length to diameter being approximately 10:1) allows the formation of a mat structure (similar to paper) in spite of the reduced length of the fibers. This mat structure effect is found to be especially desirable in that it lessens the tendency of the finely-divided glass to fall off the wire in the pyrolysis operation where the resin is burned off. This falling off of the finely-divided glass has been particularly troublesome when the glass is in flake or powder form.

After the conductors have been coated with the desired amount of slurry the wires are formed into a winding and are submitted to a pyrolysis step wherein they are heated at 500° C. for approximately ¼ hr. This pyrolysis step burns off the resin and causes the silicon resins to leave an ash which is rich in silicon dioxide but does not fuse the low melting glass fibers. This silicon dioxide aids in promoting the adhesion necessary to hold the glass to the conductor surface before and after the final sintering step. This final sintering step involves firing the coated conductor at 650° for ½ hr. whereby the glass particles are fused and form a mass of glass insulation between the interstices of the adjacent conductors.

Figure 3:
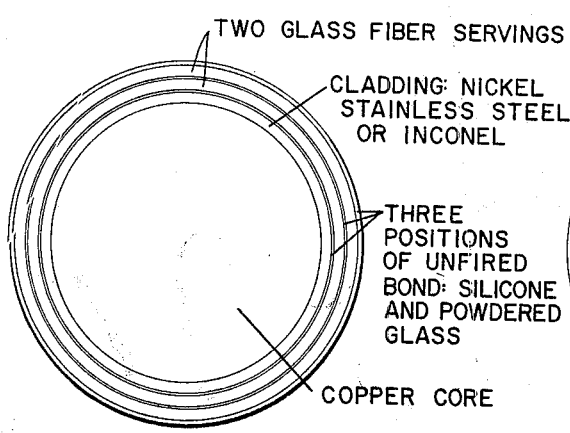
FIG. 3 is an enlarged section showing copper wire in the unfired state which is coated with a nickel coating and has three coatings of silicone and powdered glass which are separated by glass fiber servings.
Figure 4:
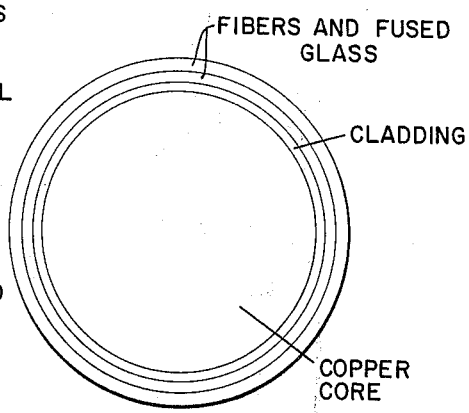
FIG. 4 is an enlarged section of the copper wire of FIG. 3 in the fired state showing the fibers and fused glass coating the wire.

In an alternative embodiment as shown in FIGS. 3 and 4 an oxidation resistant bimetallic conductor was coated with a base coat of enamel. This enamel can be of the type pigmented with finely-divided inorganic material of the type used on the conductor as described above. The base coat is then covered with at least one and preferably several servings of continuous-filament fiber glass. A slurry consisting of the same liquid resin used for the enamel wire plus a two-component glass pigment system in a finely-divided state is then applied over the servings of fiber glass to bind them in place and thereby form a flexible abrasion-resistant insulation about the conductors. It has been found that the glass fiber servings are preferably composed of aluminum borosilicate glass of the following composition:

| | |
|---|---|
| $SiO_2$ | 53.9 |
| $Al_2O_3$ | 14.2 |
| $Na_2O$ | 0.36 |
| $K_2O$ | 0.4 |
| $MgO$ | 0.1 |
| $CaO$ | 21.7 |
| $B_2O_3$ | 8.69 |
| $Fe_2O_3$ | 0.31 |
| $SO_3$ | 0.05 |
| $F_2$ | 0.44 |

One component of the two-component glass pigments in the finely-divided state is also an aluminum borosilicate type glass which is in flake form. The second component is a barium borosilicate glass of the type mentioned above in regard to the enamel wires. The barium borosilicate type glass has a lower melting point than the aluminum borosilicate glass does. In one example the slurry used to bond the fiber glass servings had the following composition:

| | |
|---|---|
| Aluminum borosilicate glass flake | 27.8 |
| Barium borosilicate glass powder | 18.6 |
| Silicone (50% solids) | 42.0 |
| Xylol | 5.8 |
| Cresylic acid | 2.4 |
| Lithium nitrate | 3.4 |

After the servings are bonded with the slurry, the wires are formed into a winding and subjected to a pyrolysis step wherein the volatile resin is burned off. This pyrolysis step is carried out at a temperature below the fusion point of the low-fusion type glass. The winding is then subjected to a sintering step wherein it is heated at a temperature above the fusion point of the barium borosilicate glass but below the fusion point of the aluminum borosilicate glass. As a result, during the sintering step the barium borosilicate glass component melts and fuses the flakes and fibers into a mass thereby leaving the formed winding insulated solely by inorganic dielectric material.

Figure 5:
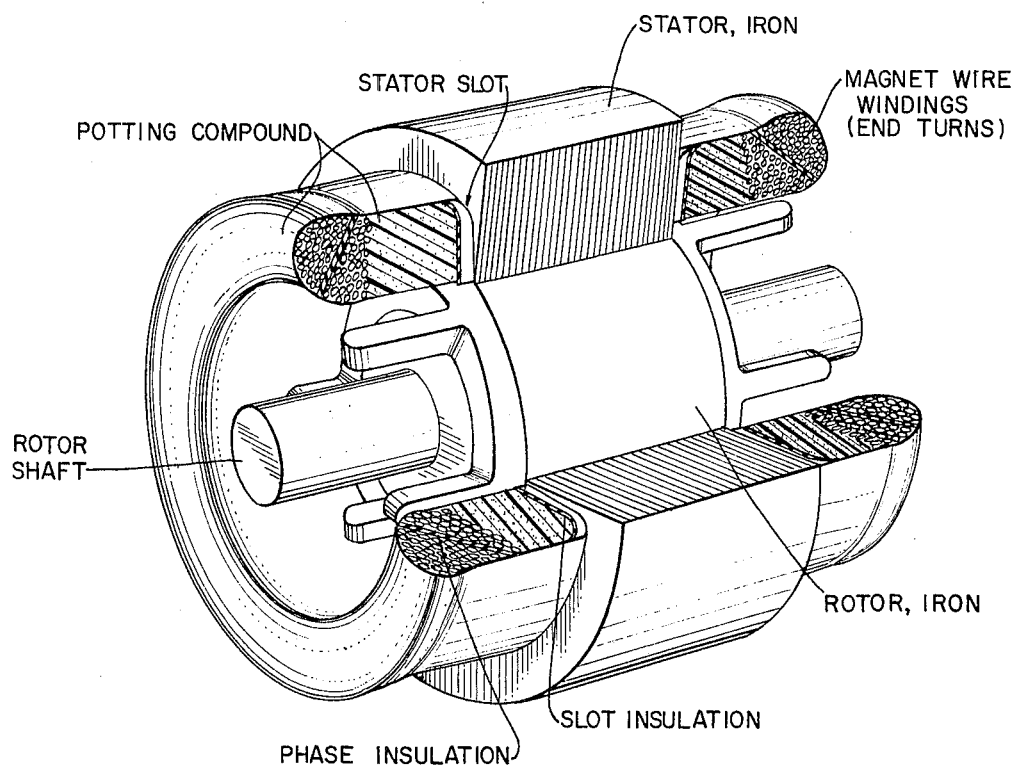
FIG. 5 is a perspective partly in section partly broken away of a wire wound motor having a winding according to the invention.

In any of these embodiments a phase insulation may be incorporated into the windings as shown in FIG. 5. One type phase insulation used consists of glass fiber cloth or paper treated on both sides and thoroughly impregnated with a slurry of a silicone varnish pigmented with a fusible glass powder of the types mentioned. The slurry used in this case can be pigmented with either the two component borosilicate type glasses used to bond the fiber glass servings, or, about 46% iron glass could be substituted for the borosilicate glasses. It is also intended that mica paper might also be used. Upon heating, the silicone varnish will pyrolytically volatilize and further heating will cause the fusible glass to fuse about the cloth or paper, thereby forming effective phase insulation.

It is also contemplated that a potting compound consisting of a light silicone varnish impregnated with a powdered glass fusible at a lower temperature than those mentioned above might also be applied around the coil after it has been formed and heated. After coating the coil with this compound the coil would again be subjected to a heating operation in which the organic varnish would volatilize and the finely-divided glass would fuse, thereby providing a very effective moisture seal.

It is further intended that additives could be added to the organic varnish or could be separately applied to the conductor and then coated with an organic varnish pigmented with the finely-divided glass. Among the additives suggested are alumina, quartz, silicates of aluminum, calcium, magnesium, sodium aluminum, lithium aluminum, zirconium, mica, magnesia, titania, talc, and flint. Thus, it is intended that any of the slurries mentioned above could have additives such as these without departing from the scope of the invention.

We claim:
1. The method of manufacturing an insulated electromagnetic winding capable of operation at temperatures above 300° C. which comprises applying to a conductor a flexible abrasion-resistant insulation comprising a covering of inorganic dielectric material bonded in place by an organic varnish, forming the thus-insulated conductor into a winding, heating the winding to a temperature above the pyrolysis point of the organic varnish for a sufficient period of time to pyrolytically volatilize all organic matter from the covering and leave the formed winding insulated solely by the inorganic dielectric material.

2. The method of manufacturing an insulated electromagnetic winding capable of operation at temperatures above 300° C. which comprises applying to a conductor a flexible abrasion-resistant insulation comprising a covering of inorganic dielectric material bonded in place by an organic varnish pigmented with finely-divided dielectric glass, forming the thus-insulated conductor into a winding, heating the winding to a temperature above the pyrolysis point of the organic varnish but below the fusing point of the glass for a sufficient period of time to pyrolytically volatilize all organic matter from the covering, and heating the winding above the fusion point of the glass to fuse the finely-divided glass to the inorganic material and leave the formed winding insulated solely by inorganic dielectric material.

3. The method of manufacturing an insulated electromagnetic winding capable of operation at temperatures above 300° C. which comprises applying to a conductor a serving of fibrous inorganic dielectric material, coating the serving with an organic varnish to bond it in place and thereby form a flexible abrasion-resistant insulation about the conductor, forming the thus-insulated conductor into a winding, heating the winding to a temperature above the pyrolysis point of the organic varnish for a sufficient period of time to pyrolytically volatilize all organic matter from the covering and leave the formed winding insulated solely by the inorganic dielectric material.

4. The method of manufacturing an insulated electromagnetic winding capable of operation at temperters above 300° C. which comprises applying to a conductor at least one serving of a fibrous inorganic dielectric material, coating the serving with at least one application of a slurry containing an organic varnish pigmented with at least one type finely-divided dielectric glass to bond the serving in place and thereby form a flexible abrasion-resistant insulation about the conductor, forming the thus-insulated conductor into a winding, and heating the winding to a temperature above the pyrolysis point of the organic varnish but below the fusion point of the glass for a sufficient period of time to pyrolytically volatilize all organic matter from the covering, and heating the winding above the fusion point of one finely-divided glass to fuse the fiinely-divided glass to the fibrous material thereby leaving the formed winding insulated solely by inorganic dielectric material.

5. The method of manufacturing an insulated electromagnetic winding capable of operation at temperatures above 300° C. which comprises applying to a conductor at least one serving of fibrous glass, coating the fibrous glass serving with a slurry containing an organic varnish pigmented with a finely-divided low-fusion type dielectric glass and a finely-divided high-fusion type dielectric glass to bind it in place and thereby form a flexible abrasion-resistant insulation about the conductor, forming the thus-insulated conductor into a winding, heating the winding to a temperature above the pyrolysis of the organic varnish but below the fusion point of the low-fusion type glass to pyrolytically volatilize all organic matter from the covering, and heating the winding to a temperature above the melting temperature of the low-fusion glass but below the melting point of the high-fusion glass to fuse the glasses together thereby leaving the formed winding insulated solely by inorganic dielectric material.

6. A method as in claim 5 wherein the organic varnish is pigmented with a finely-divided low-fusion type barium borosilicate glass and a finely-divided high-fusion aluminum type glass.

7. A method as in claim 5 wherein the said serving of fibrous glass is an aluminum borosilicate glass.

8. The method of manufacturing an insulated electromagnetic winding capable of operation at temperatures above 300° C. which comprises coating a conductor with an organic varnish, applying a serving of fibrous inorganic dielectric material to the coated conductor, coating the serving with the organic varnish to bond it in place and thereby form a flexible abrasion-resistant insulation about the conductor, forming the thus-insulated conductor into a winding, heating the winding to a temperature above the pyrolysis point of the organic varnish for a sufficient period of time to pyrolytically volatilize all organic matter from the covering and leave the formed winding insulated solely by the inorganic dielectric material.

9. The method of manufacturing an insulated electromagnetic winding capable of operating at temperatures above 300° C. which comprises coating a conductor with an organic varnish pigmented with finely-divided dielectric glass fibers, applying a serving of fibrous inorganic dielectric material to the coated conductor, coating the serving with a slurry containing an organic varnish pigmented with at least one type finely-divided glass to bond the serving in place and thereby form a flexible abrasion-resistant insulation about the conductor, forming the thus-insulated conductor into a winding, heating the winding to a temperature above the pyrolysis point of the organic varnish but below the fusion point of said finely-divided glass, and heating the winding above the melting point of one said finely-divided glasses for a sufficient period of time to pyrolytically volatilize all organic matter from the enamel and slurry and fuse the finely-divided glasses around the fibrous material thereby leaving the formed winding insulated solely by inorganic dielectric material.

10. The method of manufacturing an insulated electromagnetic winding capable of operation at temperatures above 300° C. which comprises applying to a conductor a flexible abrasion-resistant insulation comprising a covering of at least two different types of dielectric glass fibers bonded in place by an organic varnish, one type of glass fiber having a high fusion point and the other type having a lower fusion point, forming the thus-insulated conductor into a winding, heating the winding to a temperature which is above both the pyrolysis point of the organic varnish and the fusion point of the low-fusion type of glass fiber but below the fusion point of the high-fusion type of glass fiber for a sufficient period of time to pyrolytically volatilize all organic matter from the covering and to partially fuse the low-fusion type of glass fiber as a bonding between the remaining unfused glass fibers, thereby leaving the formed winding insulated solely by glass fibers bonded in place by fused glass.

11. The method of manufacturing an insulated electromagnetic winding capable of operation at temperatures above 300° C. which comprises applying to a conductor at least one serving of a flexible abrasion-resistant insulation comprising at least two different types of borosilicate glass fibers bonded in place with an organic varnish, one type of glass fiber having a high fusion point and the other type having a lower fusion point, forming the thus-insulated conductor into a winding, heating the winding to a temperature which is above both the pyrolysis point of the varnish and the fusion point of the low-fusion type fiber glass for a sufficient period of time to pyrolytically volatalize all organic matter from the covering and to partially fuse the low-fusion type of glass fiber into a bonding between the remaining unfused glass fibers, thereby leaving the formed winding insulated by fiber glass bonded in place by a matrix of fused glass.

12. A method as in claim 11 wherein the high-fusion type glass is an aluminum borosilicate glass and the low-fusion type glass is a barium borosilicate type glass.

13. The method of manufacturing an insulated electromagnetic winding capable of operation at temperatures above 300° C. which comprises applying to a conductor a flexible abrasion-resistant insulation comprising a covering of at least two different types of glass fibers bonded in place by a polysiloxane varnish, one type of glass fiber having a high fusion point and the other type having a lower fusion point, forming the thus-insulated conductor into a winding, heating the winding to a temperature which is above both the pyrolysis point of the polysiloxane varnish and the fusion point of the low-fusion type of glass fiber but below the fusion point of the high-fusion type of glass fiber for a sufficient period of time to pyrolytically volatilize all organic matter from the covering and to partially fuse the low-fusion type of glass fiber and the residual silicon dioxide remaining from the pyrolyzed varnish into a bonding between the remaining unfused glass fibers, thereby leaving the formed winding insulated solely by glass fibers bonded in place by a matrix of fused glass and residual silicon dioxide.

14. The method of manufacturing an insulated electromagnetic winding capable of operation at temperatures above 300° C. which comprises applying to a conductor a flexible abrasion-resistant covering of an organic varnish pigmented with a finely-divided low-fusion type dielectric glass and a finely-divided high-fusion type dielectric glass, forming the thus-insulated conductor into a winding, and heating the winding to a temperature above the pyrolysis point of the organic varnish and above the melting point of said low-fusion type glass but below the melting point of the high-fusion type glass to pyrolytically volatilize all organic matter from the covering and fuse the glass together thereby leaving the formed winding insulated solely by inorganic dielectric material.

15. A method as in claim 14 wherein said finely-divided glasses are of a borosilicate type glass.

16. The method of manufacturing an insulated electromagnetic winding capable of operation at temperatures above 300° C. which comprises coating a conductor with an organic varnish pigmented with a mat of glass fibers to form a flexible abrasion-resistant covering, said glass fibers each having a diameter of from 0.05 to 1.0 micron and a length of from 1.0 to 10 microns, the ratio of length to diameter of the individual fibers being approximately 10:1, forming the thus-insulated conductor into a winding, and heating the winding first to a temperature above the pyrolysis point of the organic varnish for a sufficient period of time to pyrolytically volatilize all organic matter from the covering and second to a higher temperature to fuse the glass fibers together thereby leaving the formed winding insulated solely by inorganic dielectric material.

17. The method according to claim 16 wherein the ratio of organic varnish to finely-divided glass pigment is approximately 4:1.

18. The method according to claim 16 wherein the glass fibers in the mat are barium borosilicate glass.

19. The method according to claim 16 wherein a polysiloxane varnish is used for the organic varnish thereby leaving a residue of silicon dioxide upon volatilization of the varnish whereby the formed winding is thus-insulated by a matrix of glass fibers and residual silicon dioxide.

20. The method of manufacturing an insulated electromagnetic winding capable of operation at temperatures above 300° C. which comprises applying to a conductor a flexible abrasion-resistant insulation comprising a covering of glass fibers bonded in place by a polysiloxane varnish, forming the thus-insulated conductor into a winding, heating the winding to a temperature above the pyrolysis point of the polysiloxane varnish but below the highest fusion point of the glass fibers for a sufficient period of time to pyrolytically volatilize all organic matter from the covering and create a matrix of residual silicon dioxide throughout the interstices surroundnig the glass fibers, thereby leaving the formed winding insulated solely by a matrix of glass fibers and residual silicon dioxide.

21. The method of manufacturing an insulated electromagnetic winding capable of operation at temperatures above 300° C. which comprises applying a flexible abrasion-resistant insulation to a nickel-coated copper conductor, the insulation comprising a covering of fibrous dielectric material bonded in place by an organic varnish, forming the thus-insulated conductor into a winding, heating the winding to a temperature above the pyrolysis point of the organic varnish for a sufficient period of time to pyrolytically volatilize all organic matter from the covering and leave the formed winding insulated solely by the inorganic dielectric material.

22. The method of manufacturing an insulated electromagnetic winding capable of operation at temperatures above 300° C. which comprises applying a flexible abrasion-resistant insulation to an aluminum conductor coated with a thin film of aluminum oxide, the insulation comprising a covering of fibrous dielectric material bonded in place by an organic varnish, forming the thus-insulated conductor into a winding, heating the winding to a temperature above the pyrolysis point of the organic varnish for a sufficient period of time to pyrolytically volatilize all organic matter from the covering and leave the formed winding insulated solely by the inorganic dielectric material.

23. In the manufacture of electromagnetic windings formed by winding insulated conductors, the method of forming phase insulations comprising forming a cloth impregnated with a slurry of organic varnish pigmented with finely divided inorganic dielectric materials into the winding, and heating the thus formed coil to a temperature to pyrolytically volatilize the organic varnish and then to a temperature to fuse the finely-divided material to the cloth.

24. A method as in claim 23 wherein the finely-divided dielectric material is a borosilicate glass.

25. In the manufacture of electromagnetic windings formed by winding insulated conductors, the method of providing an external insulation about the winding which comprises coating the formed winding with a slurry containing an organic varnish pigmented with finely-divided dielectric glass, and heating the coated winding first to a temperature to pyrolytically volatilize the organic resin and then to a higher temperature to fuse the finely-divided glass about the coil.

26. In the manufacture of electromagnetic windings formed by winding insulated conductors, the method of providing an external insulation about the winding which comprises coating the formed winding with a slurry containing an organic varnish pigmented with a low-fusion type borosilicate glass, and heating the coated winding first to a temperature to pyrolytically volatilize the organic resin and then to a higher temperature to fuse the glass about the coil.

References Cited by the Examiner

UNITED STATES PATENTS

| 2,307,588 | 1/1943 | Jackson et al. | 310—45 |
|---|---|---|---|
| 2,559,335 | 7/1951 | Alger | 310—208 |
| 2,589,169 | 3/1952 | Veale | 117—231 X |
| 2,691,694 | 10/1954 | Young | 174—121 |
| 2,713,715 | 7/1955 | Jenner et al. | 29—155.57 |
| 2,848,794 | 8/1958 | Roth | 29—155.57 |
| 2,975,078 | 3/1961 | Rayfield. | |
| 3,006,794 | 10/1961 | Sheldon | 174—121 X |
| 3,012,092 | 12/1961 | Whearley et al. | 174—121 |
| 3,033,917 | 5/1962 | Heckel et al. | 174—121 |
| 3,059,046 | 10/1962 | Westervelt et al. | |
| 3,078,186 | 2/1963 | Tierney | 29—155.57 X |
| 3,089,787 | 5/1963 | Sattler et al. | 117—231 |
| 3,105,287 | 10/1963 | Whearley et al. | 29—155.57 |

JOHN F. CAMPBELL, *Primary Examiner.*

MILTON O. HIRSHFIELD, WHITMORE A. WILTZ,
*Examiners.*

P. L. McBRIDE, P. M. COHEN, *Assistant Examiners.*